US006807642B2

(12) United States Patent
Yamamoto et al.

(10) Patent No.: US 6,807,642 B2
(45) Date of Patent: Oct. 19, 2004

(54) CLUSTER SYSTEM HAVING VIRTUAL RAID, COMPUTER FOR THE CLUSTER SYSTEM, AND PARITY CALCULATION METHOD IN THE CLUSTER SYSTEM

(75) Inventors: Koji Yamamoto, Kokubunji (JP); Kotaro Endo, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 10/230,339

(22) Filed: Aug. 29, 2002

(65) Prior Publication Data

US 2003/0061441 A1 Mar. 27, 2003

(30) Foreign Application Priority Data

Sep. 25, 2001 (JP) .................................. 2001-292426

(51) Int. Cl.$^7$ .................. G06F 12/16; G06F 11/10; G06F 11/18
(52) U.S. Cl. ................. 714/6; 714/7; 714/5; 714/805; 714/800; 714/801; 714/8; 711/114
(58) Field of Search ................ 711/114, 111, 112, 711/4, 5, 141; 714/6, 718, 769, 5, 7, 8, 800, 801, 805; 361/685; 707/10; 710/15, 305, 35, 24; 712/211

(56) References Cited

U.S. PATENT DOCUMENTS

| | | | |
|---|---|---|---|
| 5,862,312 A | 1/1999 | Mann et al. ............. | 714/6 |
| 5,996,089 A | 11/1999 | Mann et al. ............. | 714/6 |
| 6,256,749 B1 * | 7/2001 | Kakuta et al. ........... | 714/6 |
| 6,601,138 B2 * | 7/2003 | Otterness et al. ....... | 711/114 |
| 2002/0091897 A1 * | 7/2002 | Chiu et al. .............. | 711/114 |
| 2002/0095549 A1 * | 7/2002 | Matsunami et al. .... | 711/114 |

* cited by examiner

Primary Examiner—B. James Peikari
Assistant Examiner—Saumil R. Shah
(74) Attorney, Agent, or Firm—Finnegan, Henderson, Farabow, Garrett & Dunner, L.L.P.

(57) ABSTRACT

A cluster system managing a plurality of disk drives as a component of a virtual RAID comprises a cluster manager and a control unit. The cluster manager converts a global command G into local commands and a parity calculate command. The control unit comprises a command conversion function means, a disk control means, a parity calculation means, and a command transfer means. The command conversion function means makes the cluster manager convert the command G into the commands. The disk control means reads/writes from/to the units to according to the commands. The parity calculation means calculates the parity according to the command. The command transfer means transfers the command to one of the computer, the disk control means and the parity calculation means according to the commands.

7 Claims, 5 Drawing Sheets

FIG. 1

| Global command | | Local command 120-i (i=1,2,3) | | |
|---|---|---|---|---|
| Command ID | Address | DATA 1 (disk,position) | DATA 2 (disk,position) | PARITY (disk,position) |
| ID1 | A | DISK1, x1 | DISK2, y1 | DISK3, z1 |
| ID2 | B | DISK1, x2 | DISK2, y2 | DISK3, z2 |
| ...... | ...... | ...... | ...... | ...... |

CLUSTER SYSTEM HAVING VIRTUAL RAID, COMPUTER FOR THE CLUSTER SYSTEM, AND PARITY CALCULATION METHOD IN THE CLUSTER SYSTEM

CROSS-REFERENCE TO RELATED APPLICATIONS

This application is based upon and claims the benefit of priority from the prior Japanese Patent Application No. 2001-292426, filed Sep. 25, 2001, the entire contents of which are incorporated herein by reference.

BACKGROUND OF THE INVENTION

1. Field of the Invention

The present invention relates to a cluster system comprising a plurality of computers connected through a network, and more particularly, to a cluster system having a virtual RAID (Redundant Array of Inexpensive Disks) to permit use of each disk drive connected to each computer as a component of the virtual RAID, a computer for the cluster system, and a parity calculation method in the cluster system.

2. Description of the Related Art

A cluster system comprising a plurality of computers connected through a network has been well known as a system having the function to increase the availability of the whole cluster system by continuing operation with another computer when one computer fails.

A cluster manager operates in such a cluster system. A cluster manager has the following two functions to continue operation using another computer when a failure occurs in one computer.

The first function is to ensure the state consistency among the computers constituting a cluster system. The state consistency means that all computers of a cluster system can refer to and change the state held by a cluster manager, or all computers can always refer to the latest state.

The second function is to detect a failure in any computer of a cluster system. A cluster manager detects a failure and isolates a failed computer from a cluster system.

In this way, operation of a cluster system can be continued under the control of a cluster manager even if one computer should fail. However, in a certain type of cluster system, operation may not be continued from the state at the time of the occurrence of failure unless the data stored in the failed computer is referred to. In such a case, operation is suspended or returned to the state before the occurrence of failure.

BRIEF SUMMARY OF THE INVENTION

It is therefore an object of the present invention to make it possible to use each disk drive connected to each computer of a cluster system as an element of a virtual RAID to continue the system operation when one of the computers constituting a cluster system fails, even if the data stored in that computer is necessary to resume operation from the time of the occurrence of the failure.

According to an embodiment of the present invention, a cluster system comprises a plurality of computers connected through at least one network, and a plurality of disk drives connected to the computers. The cluster system comprises a cluster manager and a control unit.

The cluster manager performs exclusive control of the whole cluster system, and converts a global command which is necessary to handle each disk drive as a component of the virtual RAID, into at least one local command. A global command is equivalent to a read/write command to the RAID. A local command is equivalent to a read/write command to a disk drive, or a parity calculation command.

The control unit comprises a command converter, a disk control means, a parity calculation means and a command transfer means. The control unit operates in each computer, independently of a cluster manager.

The command converter communicates with the cluster manager when the global command is generated in the computer to which it belongs, and makes the cluster manager convert the global command into at least one local command.

The disk control means receives a local command, or a read/write command to the disk drive, from the command transfer means, and reads/writes from/to the disk drive according to this command.

The parity calculation means receives a local command, or a parity calculate command, from the command transfer means, and calculates parity according to this command.

The command transfer means receives a local command from the command converter, and transfers it, based on the command contents, to one of corresponding other computer, the disk control means of the computer to which it belongs and the parity calculation means.

In a cluster system with the above-mentioned structure, each disk drive connected to each computer constituting the cluster system can be used as a component of the virtual RAID. Thus, even if one computer fails, the data written to the disk drive connected to that computer can be restored by the RAID technology from another disk drive connected to another computer. This makes it possible to resume the system operation from the time of the occurrence of failure by using another computer.

The cluster manager may be given a local command generating function to be explained below. Here, the local command is a command to calculate the intermediate or final result of parity calculation using the data necessary to calculate the parity in the computer connected to the disk drive which stores the data. Further, when calculating the intermediate result, the local command transfers the obtained result to the computer connected to the disk drive which stores the data necessary to calculate the next intermediate result or final result of the parity calculation.

Generation of such local command makes it possible to avoid concentrating the data necessary for parity calculation in one computer in the writing operation of the cluster system. That is, the intermediate result of parity calculation is sequentially transferred to the computer which stores the data necessary to calculate the next intermediate result or final result of the parity calculation. Thus, the number of data transfers between the computers necessary for one parity calculation can be decreased, and the writing speed to the virtual RAID can be increased.

The cluster manager may be provided and operated in each computer and operate these cluster managers synchronously with one another through a network. With this structure, the cluster system can be prevented from being stopped as a whole system if a failure occurs in one computer.

A cluster manager may be provided in the computer provided exclusively for the cluster manager, independently of the other computers, and operate the cluster manager only in that exclusive computer. This will decrease the load on the other computers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Hereinafter, preferred embodiments of the present invention will be explained with reference to the accompanying drawings.

[Embodiment 1]

Figure 1:
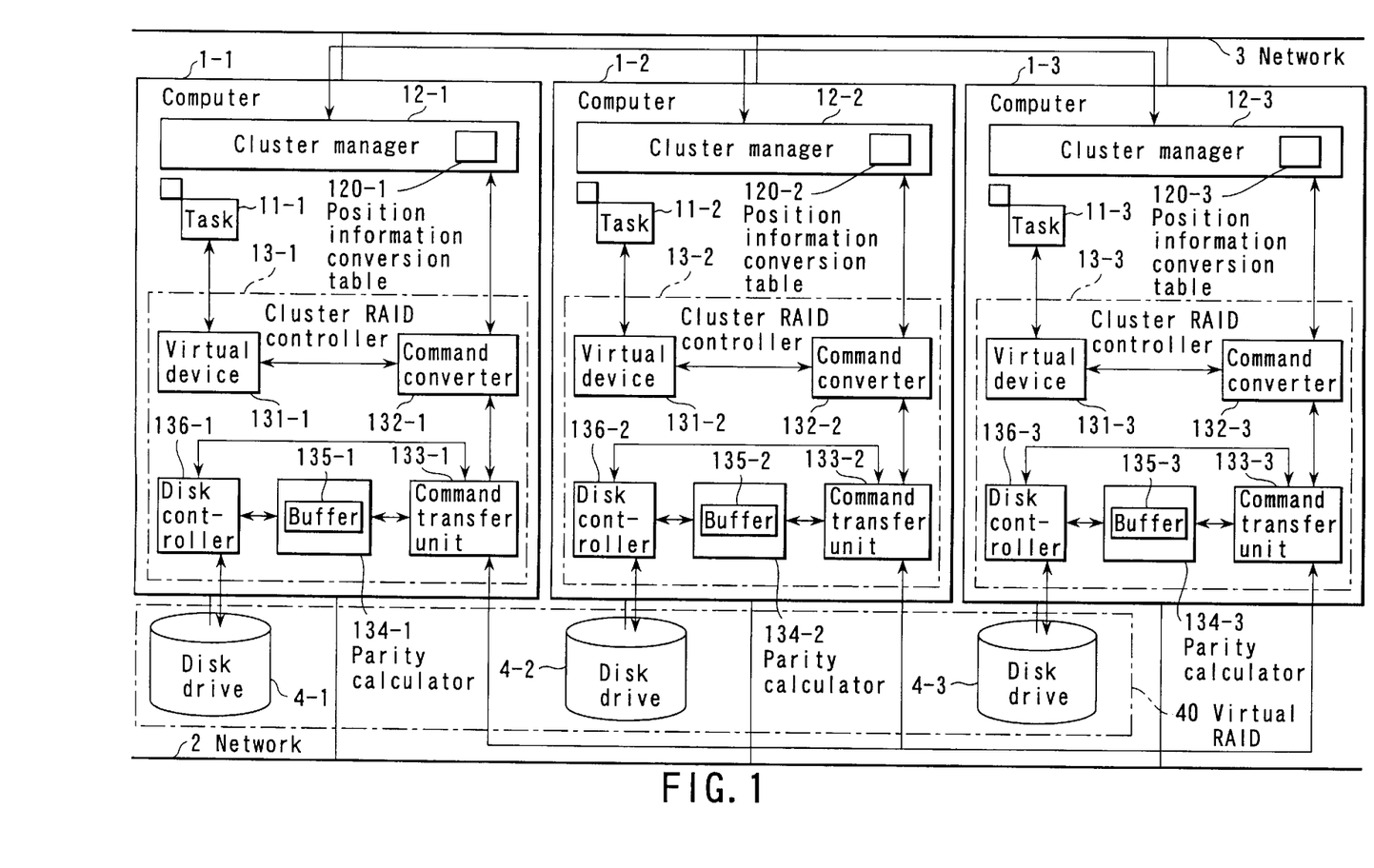
FIG. 1 is a block diagram showing a configuration example of a cluster system having a virtual RAID according to a first embodiment of the present invention.

FIG. 1 is a block diagram showing a configuration example of a cluster system having a virtual RAID according to a first embodiment of the present invention.

In FIG. 1, a plurality of computers 1-1, 1-2 and 1-3, for example, three computers, are connected through two networks 2 and 3. The networks 2 and 3 are LANs (Local Area Networks), for example. The computers 1-1, 1-2, 1-3 are connected to disk drives 4-1, 4-2, 4-3, respectively. The disk drives 4-1 to 4-3 are used as stand-alone disk drives constituting a virtual RAID 40 shared by the computers 1-1 to 1-3. Namely, in the cluster system of FIG. 1, the virtual RAID 40 is composed of the disk drives 4-1, 4-2, 4-3 connected to the computers 1-2, 1-2, 1-3, respectively.

Generally, a RAID has two merits. The first merit is that the data stored in a plurality of stand-alone disk drives constituting that RAID can be shared by a plurality of computers connected to that RAID via a controller. This controller collectively controls the stand-alone disk drives constituting the RAID.

The second merit is that even if a failure should occur in one of the plurality of disk drives constituting the RAID, the data stored in the failed disk can be restored by the RAID technology from the data of the remaining disks, and thereby the data availability can be increased.

As stated above, a RAID needs a controller to collectively control the disk drives constituting the RAID. However, such a controller is not provided in the cluster system. Thus, a virtual RAID 40 cannot be realized by simply applying the conventional RAID structure to the cluster system. In the first embodiment of the invention, the controller function of a virtual RAID 40 is realized by another method.

Before explaining an example of the control function of the virtual RAID, the function of the above-mentioned controller, or the RAID technology will be explained, assuming that there is a controller for the virtual RAID 40; the virtual RAID 40 is an ordinary RAID.

First, tasks 11-1 to 11-3 are operating in the computers 1-1 to 1-3. A task means software such as an operating system (OS) and application programs.

In writing data to the RAID, data itself is written. Here, this data is called RAID data. In addition, parity, or redundancy data calculated from the RAID data, is written to one of the disk drives 4-1 to 4-3 except the one which stores RAID data.

Now, assuming that the RAID data d1 and d2 is stored in the disk drives 4-1 and 4-2, and parity p is stored in the disk drive 4-3, respectively, the parity can be calculated by the equation:

$$P = d1 \, XOR \, d2$$

Where, XOR indicates EXCLUSIVE-OR operation.

Even if one of the disk drives 4-1 to 4-3 fails and becomes inoperable, the RAID data can be read/written using the RAID data and parity p stored in the remaining disks.

For example, if the disk drive 4-1 fails, the following exclusive-OR operation is executed to read out the RAID data d1, by using the RAID data d2 stored in the remaining disk 4-2 and the parity p stored in the disk drive 4-3:

$$d1 = p \, XOR \, d2$$

If the disk drive 4-3 fails, the RAID data d1 and d2 can be read from the disk drives 4-1 and 4-2.

The read/write command from the task 11-1, 11-2 or 11-3 is processed by the controller of the RAID 40. The write command includes the data to write and the information to identify the place to write to, or address information. The read command includes the address information.

The controller stores a table showing the relation between the logical address information used by the read/write command from the task 11-$i$ ($i$ is 1–3), and the position information used to identify the place in disk drive 4 to write the RAID data and parity to. This table will be hereinafter referred to as a position information conversion table. The controller also has a function to calculate parity and a function to read/write from/to a disk drive.

Further, the controller has the function to convert the read/write command received from the task 11-$i$ into the read/write command and parity calculation command to the disk drive 4-$j$ ($j$ is 1–3). Hereinafter, the read/write command received from the task 11-$i$ is called a global command, and the read/write command and parity calculation command to the disk drive 4-$j$ are called local commands, respectively.

A global write command is converted into a plurality of local commands to designate the following three operations.

RAID data read/write

Parity read/write

Parity calculation

Now, the process of updating RAID data by the controller will be explained taking an example of updating RAID data d1 to d1'.

(a1) Read old RAID data d1 from the disk drive 4-1.
(a2) Read old parity p from the disk drive 4-3.
(a3) Calculate parity. New parity p' is:

$$p'=d1\ XOR\ d2=d1\ XOR\ p\ XOR\ d1$$

Therefore, new parity p' can be calculated from new RAID data d1', old parity p and old RAID data d1.

(a4) Write new parity p' to the disk drive 4-3.
(a5) Write new RAID data d1' to the disk drive 4-1.

As a method of calculating new parity p', there is another method using other RAID data d2 (second method) in addition to the method using old RAID data d1 and old parity p (first method). In the above example, the second method reads other RAID data d2 from the disk drive 4-2, and executes the following exclusive-OR operation, thereby obtaining new parity p':

$$p'=d1\ XOR\ d2$$

However, when there are five or more stand-alone disk drives 4, the amount of RAID data to be read from the disk drives 4 is less in the first method. This will be explained in more detail, assuming that there are six stand-alone disk drives 4 and each stores RAID data d1, d2, d3, d4, d5 and parity p, and old parity p is updated to new parity p'.

To obtain new parity p' by the first method, only one RAID data d1 and parity p are read:

$$p'=d1\ XOZ\ p\ XOR\ d1$$

Using the second method, four RAID data d2, d3, d4 and d5 must be read:

$$p'=d1\ XOR\ d2\ XOR\ d3\ XOR\ d4\ XOR\ d5$$

If one of the disk drives 4-1 to 4-3 fails, the controller detects the failed disk drive 4 and isolates it from the system. For example, when the disk drive 4-1 fails, neither RAID data d1 is read nor RAID data d1' is written to update the RAID data d1 to d1' in this state. In this case, the parity without using the RAID data d1 is calculated, that is, the second method is used to calculate the parity, and the parity only is updated.

The procedure is as follows:

(b1) Read RAID data d2 from the disk drive 4-2.
(b2) Calculate new parity p' by:

$$p'=d1\ XOR\ d2$$

(b3) Write the new parity p' to the disk drive 4-3.

As shown above, the second method is necessary to obtain new parity p' in the state where old RAID data d1 cannot be read.

Description will now be given of the operation of the controller in the case where a plurality of read/write commands relating to the same RAID data is sent from the task 11-$i$ to the controller.

It is no problem to execute two or more read commands simultaneously. However, if a read command and a write command are executed simultaneously, or two or more write commands are executed simultaneously, the RAID data and parity p in the disk drive 4 will be destroyed. In such a case, the controller exclusively controls each command.

Therefore, the controller which collectively controls the disk drives 4-1, 4-2, 4-3 constituting the virtual RAID 40, must have the following six functions:

(1) Position information control
(2) Detection of failure in disk drives 4-1, 4-2, 4-3, and isolation of failed disk drive from the cluster system
(3) Exclusive control
(4) Conversion of read/write command (Conversion from global command to local command)
(5) Reading/writing from/to the disk drives 4-1, 4-2, 4-3
(6) Parity calculation Next, the configuration of the computers 1-1 to 1-3 to realize the above-mentioned controller functions (1)–(6) will be explained.

In addition to the above-mentioned tasks 11-1 to 11-3, cluster managers 12-1 to 12-3 and cluster RAID controllers 13-1 to 13-3 are operating on the computers 1-1 to 1-3. The cluster managers 12-1 to 12-3 communicate with one another through a network 3, thereby forming one virtual cluster manager in the cluster system.

Using the cluster manager 12-$i$ and cluster RAID controller 13-$i$ ($i$=1, 2, 3), the above-mentioned controller functions (1)–(6) are realized in this first embodiment as described hereinafter.

Figure 2:
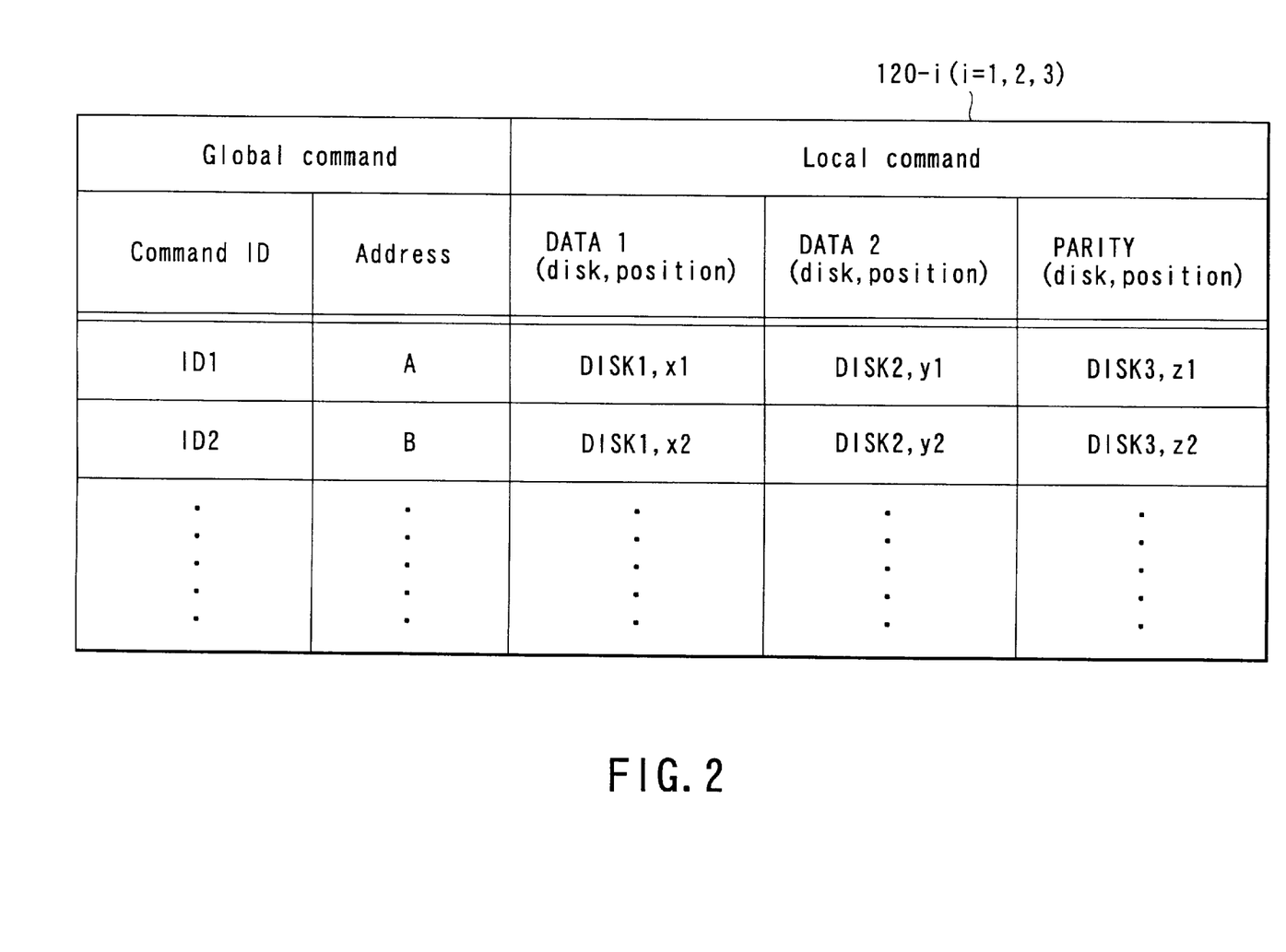
FIG. 2 is a table showing a data structure example of a position information conversion table held by a cluster manager shown in FIG. 1.

When a change occurs in the position information conversion table necessary to access a disk drive 4-$i$, all computers 1-1 to 1-3 should be able to refer to the same information in that table. This information is held as state information by the cluster manager 12-$i$, thereby the above function (1) is realized and information consistency is ensured. For this purpose, the cluster manager 12-$i$ holds the position information conversion table 120-$i$. An example of the data structure in this table 120-$i$ is shown in FIG. 2. The position information conversion table 120-$i$ accepts the entry of the address information used by a global command, the position information to identify the disk drive 4 to which the first/second RAID data (DATA 1, DATA 2) is written among the disk drives 4-1 to 4-3, and the position information to identify the disk drive 4 to which the parity is written among the disk drives 4-1 to 4-3, for all ID information of a global command to specify writing. The cluster managers 12-1 to 12-3 are synchronized through the network 3, thereby making the position information conversion tables 120-1 to 120-3 consistent.

Assuming that a controller of a RAID 40 exists, the controller must detect failures only in the disk drives 4-1 to 4-3. However, in the cluster system, the computers 1-1 to 1-3 having the disk drives 4-1 to 4-3 may fail, and consequently the disk drives 4-1 to 4-3 connected to these computers 1-1 to 1-3 may become impossible to read/write with. Therefore, the cluster manager 12-$i$ of this embodiment is given the function to detect a failure in the computer 1-$i$ in addition to the disk drive 4-$i$, thereby realizing the function (2).

The functions (4)–(6), conversion of read/write command, RAID data writing and parity calculation will destroy the RAID data and parity without being exclusively controlled by the function (3). If the cluster manager 12-$i$ of each computer 1-$i$ handles all these operations, they can be operated in synchronism with one another. However, if the cluster manager 12-$i$ of each computer 1-$i$ is operated synchronously with the other cluster managers 12-$i$, the operation speed drops compared to exclusive control by one controller of an ordinary RAID. Generally, as the number of computers increases, the cluster system performance increases. But, the cluster manager 12-$i$ of each computer 1-$i$ is operated synchronously with the others. Thus, the increased number of computers increases the load on the cluster manager 12-$i$, and the system performance is not increased.

To solve this problem, a cluster manager 12-$i$ is used in this embodiment to obtain a lock when beginning the read/write operation, and is used again to release the lock on finishing the write operation. This enables reading/writing from/to a disk drive 4-$i$ without using the cluster manager 12-$i$. This realizes writing performance corresponding to the system scale, or scalable writing performance, while executing exclusive control equivalent to that made by a controller of an ordinary RAID.

In the first embodiment, the reading/writing from/to disk drive 4-$i$ and parity calculation by the functions (5) and (6) are executed by the cluster RAID controller 13-$i$. The transfer of the read/written data and read/write commands between computers is also executed by the cluster RAID controller 13-$i$.

As for the function to convert a global command or a read/write command from the task 11-$i$ into a local command as explained by the above function (4), the cluster RAID controller 13-$i$ uses a cluster manager 12-$i$ to exclusively control the command.

As described above, the global command from the task 11-$i$ is sent to the cluster RAID controller 13-$i$. The cluster RAID controller 13-$i$ uses the cluster manager 12-$i$ to convert the global command into a local command. Further, the cluster manager 12-$i$ obtains a lock for exclusive control, and writes and refers the RAID data and parity to the disk drive 4-$i$. The cluster RAID controller 13-$i$ communicates with another cluster RAID controller 13-$i$ operating on another computer 1-$j$ ($j=1, 2, 3$, but $j \neq i$) through the network 2.

A cluster RAID controller 13-1 to 13-3 comprises a virtual device 131-1 to 131-3, a command converter 132-1 to 132-3, a command transfer unit 133-1 to 133-3, a parity calculator 134-1 to 134-3 and a disk controller 136-1 to 136-3. The parity calculator 134-1 to 134-3 has a buffer 135-1 to 135-3.

The global command from the task 11-$i$ is sent to the virtual device 131-$i$ on the cluster RAID controller 13-$i$. The virtual device 131-$i$ makes the cluster RAID controller 13-$i$ appear to be a storage device to the task 11-$i$. The virtual device 131-$i$ is a kind of device driver on the OS of the computer 1-$i$.

The global command is further sent from the virtual device 131-$i$ to the command converter 132-$i$. The command converter 132-$i$ communicates with the cluster manager 12-$i$, and makes the cluster manager convert the global command to at least one local command. The command converter 132-$i$ sends the local command to the command transfer unit 133-$i$, and obtains a lock to exclusively execute said local command.

When the position information of the local command designates the disk drive 4-$j$ in another computer 1-$j$, the command transfer unit 133-$i$ sends the local command to the command transfer unit 133-$j$ in that computer 1-$j$. When the position information designates the own computer 1-$i$, the command transfer unit 133-$i$ sends the local command to the parity calculator 134-$i$ or disk controller 136-$i$ according to the contents of the local command. The parity calculator 134-$i$ reads the RAID data or parity from the disk drive 4-$i$ through the disk controller 136-$i$, and calculates the parity.

Figure 3:
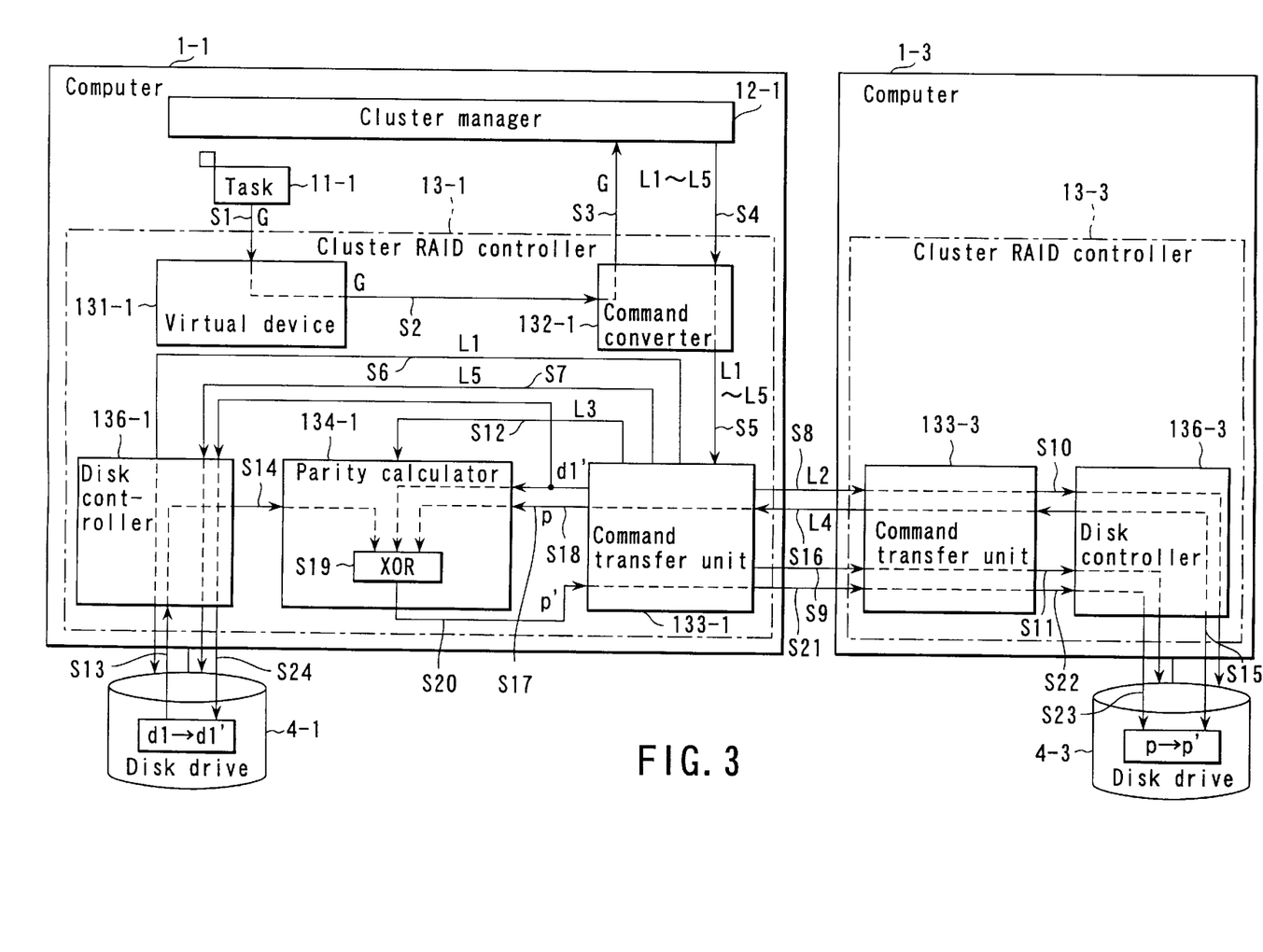
FIG. 3 is a schematic diagram explaining an operation example in execution of a global command to update RAID data stored in a disk drive of the first embodiment of the invention.

Now, operation of the first embodiment will be explained based on the operation of the cluster RAID controller 13-1 with reference to the schematic diagram of FIG. 3, taking as an example of a global write command to update the RAID data d1 stored in the disk drive 4-1 to RAID data d1'.

When reading/writing from/to the virtual RAID 40 becomes necessary, the task 11-1 operating on the computer 1-1 sends a global command to specify reading/writing from/to the virtual device 131-1 in the cluster RAID controller 13-1. The virtual device 131-1 sends the global command to the command converter 132-1.

The command converter 132-1 sends the global command to the cluster manager 12-1 to convert it to a local command. Before converting the command, the cluster manager 12-1 checks if that the area of the disk drive 4 designated by the local command is locked. When the area is locked, the cluster manager 12-1 waits until the area is unlocked, and then sends the local command back to the command converter 132-1, and generates the lock information necessary for exclusive control according to the local command. This lock information is sent to the cluster managers 12-2, 12-3 on the computers 1-2, 1-3 through the network 3. As a result, the cluster managers 12-1 to 12-3 execute exclusive control of the whole system, and the cluster RAID controllers 13-1 to 13-3 can obtain the lock to exclusively execute the local command.

Conversion of a global command to a local command by the cluster manager 12-1 is performed as follows, and is like the conversion by the controller in an ordinary RAID as already explained. First, the cluster manager 12-1 refers to the address information included in the global command, and obtains the position information corresponding to the address information by using its own position information conversion table 120-1. If the global command is a read command, the cluster manager 12-1 generates a local command which includes the obtained position information. If the global command is a write command, the cluster manager 12-1 determines the position information relating to the corresponding RAID data and parity according to the obtained address information. Then, the cluster manager 12-1 generates a group of local commands to specify reading of old RAID data, which is the former data necessary for parity calculation, reading of old parity, which is the former parity, calculating of new parity, writing of new data, and writing of new parity.

Now, it is assumed that the global command is the write global command G to update the RAID data d1 stored in the disk drive 4-1 to RAID data d1', as when the functions of the controller were explained hereinbefore. In this case, as shown by steps S1 to S3, the global command G is sent from the task 11-1 to the cluster manager 12-1 via the virtual device 131-1 and command converter 132-1. The cluster manager 12-1 converts the global command G to local commands L1–L5, as explained below.

The local command L1 for the above-mentioned process (a1), or the local command L1 to specify reading old RAID data d1 from the disk drive 4-1, is generated first. Next, the local command L2 for (a2), or the local command L2 to specify reading old parity p from the disk 4-3 corresponding to the RAID data d1, is generated. Then, the local command L3 to specify obtaining new parity p' from new RAID data d1', old parity p and old RAID data d1, by calculating p'=d1' XOR p XOR d1, is generated for the process (a3). Here, old parity p is read from the disk drive 4-3 according to the local command L2. Old RAID data d1 is read from the disk drive 4-1 according to the local command L1.

Next, for (a4), the local command L4 to specify writing new parity p' to the disk drive 4-3, is generated. Here, new parity p' is calculated according to the local command L3.

Finally, the local command L5 to specify writing new RAID data d1' to the disk drive 4-1, is generated for (a5).

The above example is based on the assumption that the global command is sent from the task 11-1 operating on the computer 1-1 to the virtual device 131-1 of the cluster RAID controller 13-1. However, if the global command is sent from the tasks 11-2, 11-3 operating on the computers 1-2, 1-3 to the virtual devices 131-2, 131-2 of the cluster RAID controllers 13-2, 13-3, the global command will also be converted into local commands. That is, as the cluster manager 12-1 did, the cluster managers 12-2, 12-3 in the computers 1-2, 1-3 convert the global command into local commands to meet the demand from the command converters 132-2, 132-3 of the cluster RAID controllers 13-2, 13-3.

As described above, in this embodiment, cluster managers 12-1 to 12-3 perform the command conversion, which is performed by a controller in an ordinary RAID, at the request of the cluster RAID controllers 13-1 to 13-3. This is because the RAID 40 is a virtual unit comprising disk drives 4-1 to 4-3 connected to computers 1-1 to 1-3, and is not provided with a controller to collectively control the disk drives 4-1 to 4-3, unlike an ordinary RAID.

The command converter 132-1 receives the local command from the cluster manager 12-1, and sends this local command to the command transfer unit 133-1. The command transfer unit 133-1 refers to the position information of the received local command, and determines whether this command is for the computer 1-1 on which the transfer unit 133-1 itself operates, or for the other computers 1-2 and 1-3.

If the command is for the other computers 1-2 or 1-3, the command transfer unit 133-1 sends the local command to the command transfer unit 133-2 or 133-3 of the computer 1-2 or 1-3 through the network 2.

If the command is for the own task 11-$i$, the command transfer unit 133-1 determines whether the command is a parity calculation command or a read/write command for the disk drive 4-1. If the command is a parity calculation command, the command transfer unit 133-1 transfers the command to the parity calculator 134-1. If the command is a read/write command for the disk drive 4-1, the command transfer unit 133-1 transfers the command to the disk controller 136-1. The same operation is performed by the command transfer unit 133-2 or 133-3 of the computer 1-2 or 1-3 when a local command is transferred thereto from the command transfer unit 133-1.

Therefore, as described above, in the example where the global command G is a write command to update the RAID data d1 stored in the disk drive 4-1 to the RAID data d1', the operations are the same as indicated by steps S4 and S5. That is, the cluster manager 12-1 sends the local commands L1 to L5 converted from the global command G to the command transfer unit 133-1 via the command converter 132-1.

Then, as indicated by steps S6 and S7, the local command L1 to specify reading old RAID data d1 from the disk drive 4-1 and the local command L5 to specify writing new RAID data d1' to the disk drive 4-1 are transferred to the disk controller 136-1 from the command transfer unit 133-1.

Further, as indicated by steps S8 and S9, the local command L2 to specify reading old parity p from the disk drive 4-3 and the local command L4 to specify writing new parity p' to the disk drive 4-3 are transferred to the command transfer unit 133-3 from the command transfer unit 133-1.

Further, as indicated by steps S10 and S11, the local commands L2 and L4 are transferred to the disk controller 136-3 from the command transfer unit 133-3. As indicated by step S12, the local command L3 to specify calculating new parity p' from new RAID data d1', old parity p and old RAID data d1 is transferred to the parity calculator 134-1 from the command transfer unit 133-1.

The disk controllers 136-1 and 136-3 receive the local commands from the command transfer units 133-1 and 133-3, and perform reading/writing from/to the disk drives 4-1 and 4-3 according to these local commands. In this example, as indicated by steps S13 and S14, the old RAID data d1 is read from the disk drive 4-1 by the disk controller 136-1 and transferred to the parity calculator 134-1 according to the local command L1.

Further, as indicated by steps S15 to S17, the disk controller 136-3 reads old parity p from the disk drive 4-3 according to the local command L2. The old parity p is transferred from the command transfer unit 133-3 to the parity calculator 134-1 via the command transfer unit 133-1.

Further, as indicated by step S18, the new RAID data d1' is also transferred from the command transfer unit 133-1 to the parity calculator 134-1. Local commands and data are transferred between the command transfer unit 133-1 in the computer 1-1 and the command transfer unit 133-3 in the computer 1-3 via the network 2.

As indicated by step S19, the new RAID data d1', old parity p and old RAID data d1 transferred to the parity calculator 134-1 are temporarily stored in the buffer 135-1 in the parity calculator 134-1. The parity calculator 134-1 calculates new parity p' from the RAID data d1', old parity p and RAID data d1 stored in the buffer 135-1 using the equation p'=d1' XOR p XOR d1. By executing this exclusive-OR (XOR) operation, the parity calculator calculates the new parity p' by the above-mentioned first method.

Steps S20 to S22 indicate that the new parity p' obtained by the parity calculator 134-1 is transferred from the command transfer unit 133-1 to the disk controller 136-3 via the command transfer unit 133-3 in the computer 1-3.

Step S23 indicates that the disk controller 136-3 updates the old parity p stored in the disk drive 4-3 to new parity p' according to the local command L4. As indicated by step S18, the new RAID data d1' is also transferred from the command transfer unit 133-1 to the disk controller 136-1.

Further, as indicated by step S24, the disk controller 136-1 updates the old RAID data d1 stored in the disk drive 4-1 to new RAID data d1' according to the local command L5.

Description will now be given of the operation that taken place when a failure occurs in one computer 1-1, for example, among the computers 1-1 to 1-3 constituting the cluster system.

A failure in the computer 1-1 is detected by the cluster manager 12-1 in the computer 1-1. In this case, the disk drive 4-1 connected to the computer 1-1 cannot be used. However, as in the case where one disk drive fails in an ordinary RAID system, the RAID data and parity stored in the remaining disk drives 4-2 and 4-3 will be read out. Therefore, reading the RAID data equivalent to that stored in the computer 1-1, or restoring the RAID data stored in the computer 1-1 is enabled by the above-mentioned second method.

If a global command requiring the reading of RAID data from the disk drive 4-1 is sent from the command converter 132-1 while a failure is occurring in the computer 1-1, the cluster manager 12-1 generates a local command to read the RAID data from the disk drive 4-1 without using the disk drive 4-1.

For example, when it is necessary to read the RAID data d1 from the disk drive 4-1, the cluster manager 12-1 generates a local command to read the RAID data d2 corresponding to the RAID data d1 from the disk drive 4-2. The cluster manager 12-1 also generates a local command to read the parity p from the disk drive 4-3. Further, by using the parity p and RAID data d2, the cluster manager 12-1 generates a local command to specify parity calculation for restoring the RAID data d1 in the disk drive 4-1 by calculating the equation d1=p XOR d2.

The following operations are almost the same as those carried out when the local commands L1–L5 are generated from the above-mentioned global command. The operations are also the same as those carried out when writing or updating the data of the disk drive 4-1.

Figure 4A:
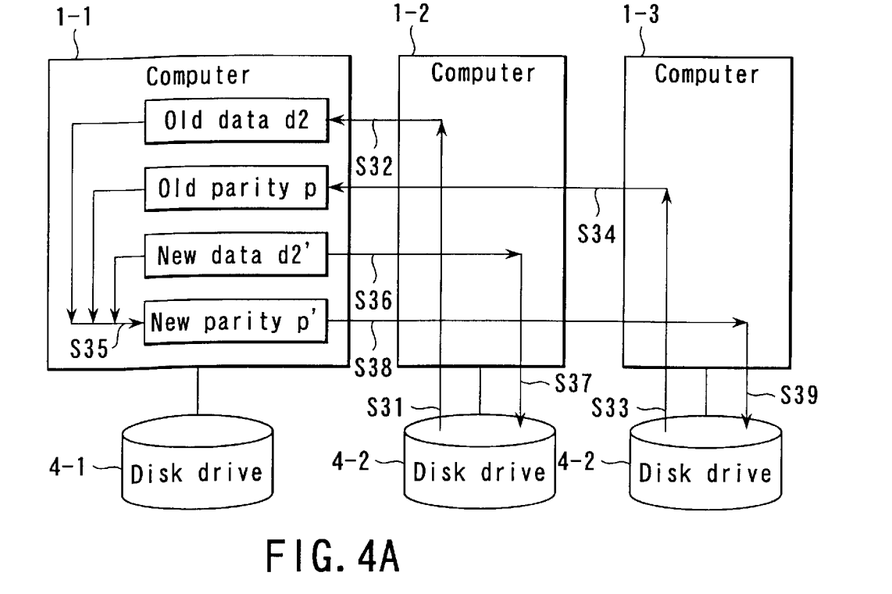
FIG. 4A is a schematic diagram explaining an operation example when a global command which rewrites the RAID data stored in a disk drive connected to a computer is generated in that computer of the first embodiment of the invention.

Referring to FIG. 4A, description will be given of the procedure carried out when a global command to specify writing is generated by the task 11-1 operating in the computer 1-1, and the global command specifies rewriting the old RAID data d2 stored in the disk 4-2 connected to the computer 1-2 to new RAID data d2'.

First, as indicated by step S31, the cluster RAID controller 13-2 in the computer 1-2 reads the old data d2 from the disk drive 4-2.

Next, as indicated by step S32, the cluster RAID controller 13-2 in the computer 1-2 transfers the old data d2 to the cluster RAID controller 13-1 in the computer 1-1 via the network 2.

Then, as indicated by step S33, the cluster RAID controller 13-3 in the computer 1-3 reads the old parity p from the disk drive 4-3.

Then, as indicated by step S34, the cluster RAID controller 13-3 in the computer 1-3 transfers the old parity p to the cluster RAID controller 13-1 in the computer 1-1 via the network 2.

Then, as indicated by step S35, the cluster RAID controller 13-1 in the computer 1-1 performs the exclusive-OR operation using the old data d2, old parity p and new data d2', and generates new parity p' using the equation p'=d2' XOR p XOR d2.

In step S36, the cluster RAID controller 13-1 in the computer 1-1 transfers the new data d2' to the cluster RAID controller 13-2 in the computer 1-2 via the network 2.

Next, in step S37, the cluster RAID controller 13-2 in the computer 1-2 updates the old data d2 in the disk drive 4-2 to new data d2'.

Further, in step S38, the cluster RAID controller 13-1 in the computer 1-1 transfers the new parity p' generated by step S35 to the cluster RAID controller 13-3 in the computer 1-3 via the network 2.

Next, in step S39, the cluster RAID controller 13-3 in the computer 1-3 updates the old parity p stored in the disk drive 4-3 to new parity p'.

In this way, the new parity p' and new data d2' can be written to the disk drives 4-2 and 4-3, respectively. However, in the procedure shown in FIG. 4A, the data transfer between computers via the network 2, namely the RAID data transfer and parity transfer, occurs four times. Therefore, the performance of reading/writing from/to the virtual RAID 40 will be lower.

Figure 4B:
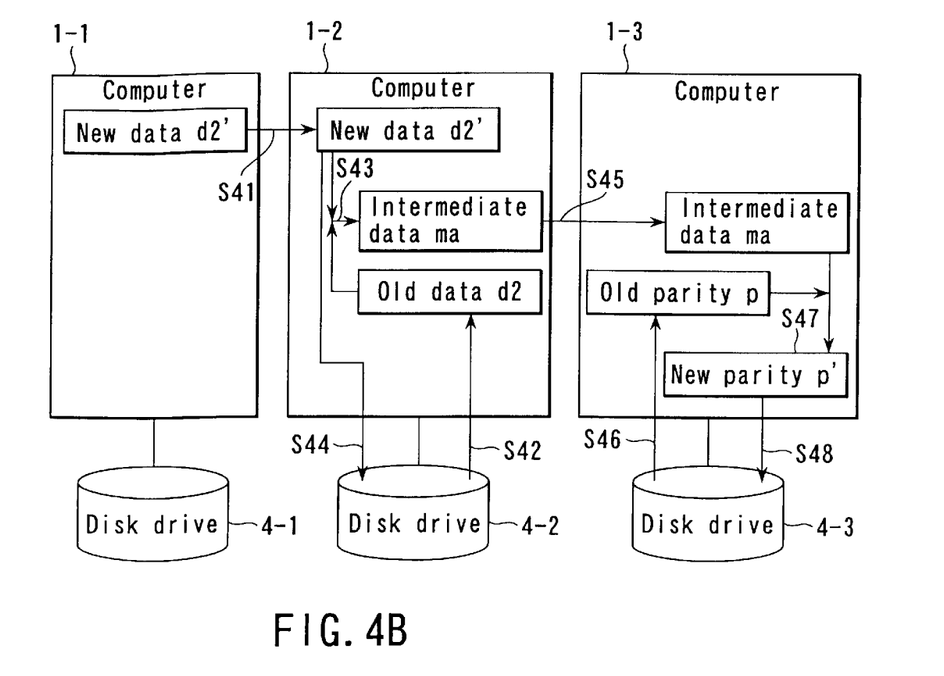
FIG. 4B is a schematic diagram explaining another operation example when a global command which rewrites RAID data in a disk drive connected to a computer is generated in that computer of the first embodiment of the invention.

Referring to FIG. 4B, a modification of the first embodiment for decreasing the number of data transfers between computers will be explained hereinafter. It is also assumed in this modification, as in FIG. 4A, that the task 11-1 in the computer 1-1 generates a global command to specify rewriting the old RAID data d2 stored in the disk drive 4-2 connected to the computer 1-2 to new RAID data d2'.

First, as indicated by step S41, the cluster RAID controller 13-1 in the computer 1-1 transfers the new data d2' to the cluster RAID controller 13-2 in the computer 1-2 via the network 2.

Next, as indicated by step S42, the cluster RAID controller 13-2 in the computer 1-2 reads the old data d2 from the disk drive 4-2.

Next, as indicated by step S43, the cluster RAID controller 13-2 in the computer 1-2 calculates the exclusive-OR using the new data d2' transferred from the cluster RAID controller 13-1 in the computer 1-1 and the old data d2 read from the cluster RAID control 13-2 in the computer 1-2. Namely, the exclusive-OR operation ma=d2' XOR d2 is performed and the intermediate result ma is obtained.

Further, as indicated by step S44, the cluster RAID controller 13-2 in the computer 1-2 updates the old data d2 stored in the disk drive 4-2 to new data d2'.

Next, as indicated by step S45, the cluster RAID controller 13-2 in the computer 1-2 transfers the intermediate result ma obtained by step S43 to the cluster RAID controller 13-3 in the computer 1-3 via the network 2.

Next, as indicated by step S46, the cluster RAID controller 13-3 in the computer 1-3 reads the old parity p from the disk drive 4-3.

Next, as indicated by step S47, the cluster RAID controller 13-3 in the computer 1-3 calculates the exclusive-OR using the old parity p read by the cluster RAID controller 13-3 and the intermediate data ma transferred from the cluster RAID controller 13-2 in the computer 1-2. Namely, the exclusive-OR operation p'=p XOR ma is carried out and new parity p' is obtained.

Finally, as indicated by step S48, the cluster RAID controller 13-3 in the computer 1-3 updates the old parity p stored in the disk drive 4-3 to new parity p'.

As described above, in this modification, the number of data transfers is decreased from 4 to 2 by transferring the intermediate result ma, or the intermediate result of parity calculation, to the computer necessary for the next calculation, that is the computer 1-3 connected to the disk drive 4 which stores the data.

[Embodiment 2]

Figure 5:
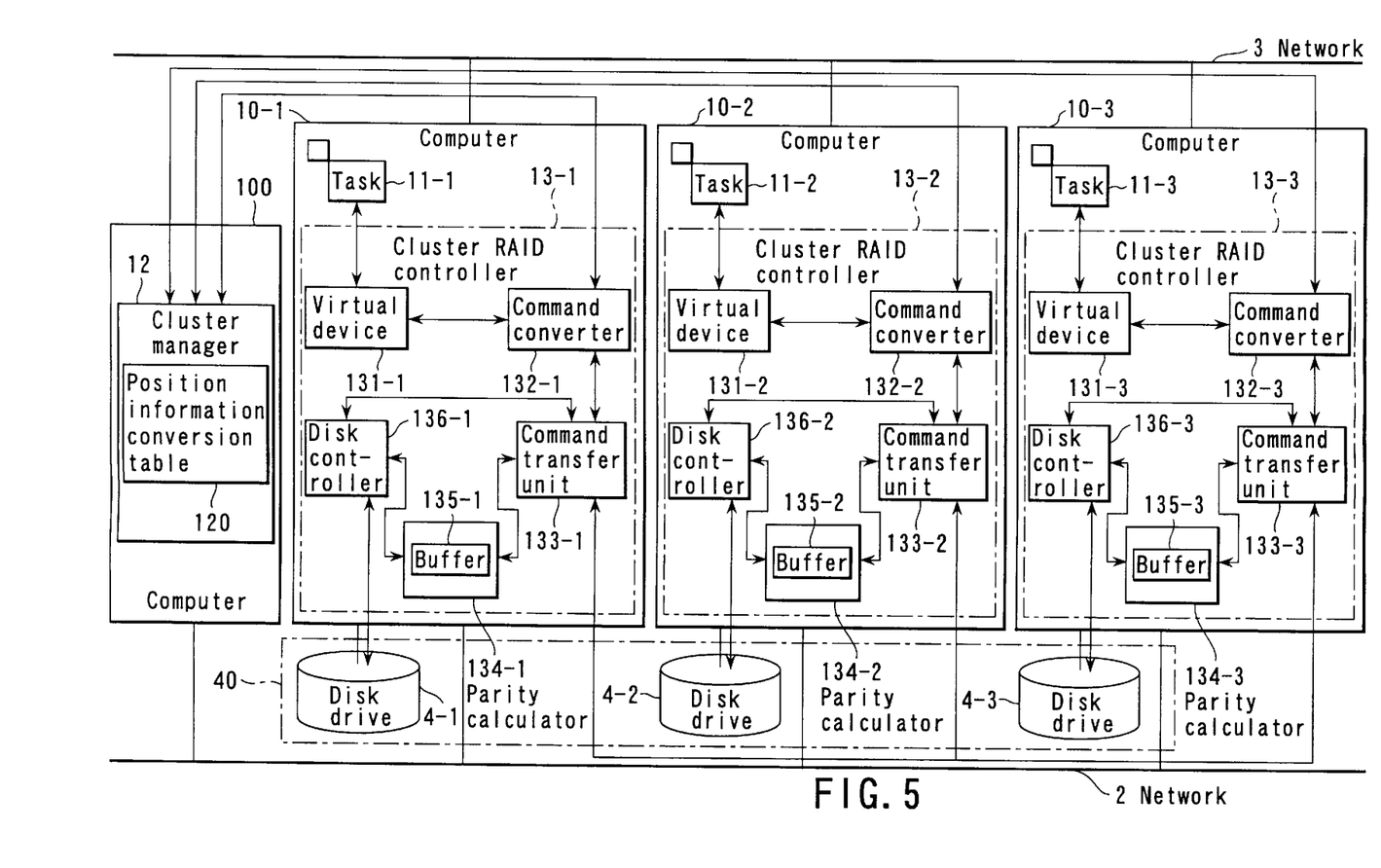
FIG. 5 is a block diagram showing a configuration example of a cluster system having a virtual RAID according to a second embodiment of the invention.

FIG. 5 is a block diagram showing a configuration example of a cluster system having a virtual RAID according to a second embodiment of the present invention. The same reference numbers are given to the same components as those in FIG. 1.

The cluster system of FIG. 5 has a computer 100 provided exclusively for a cluster manager 12 corresponding to the cluster managers 12-1 to 12-3 in FIG. 1, in addition to computers 10-1 to 10-3 corresponding to the computers 1-1 to 1-3 in FIG. 1. Further, no cluster managers operate on the computers 10-1 to 10-3. The cluster manager 12 has a position information conversion table 120 corresponding to the position information conversion table 120-$i$ with the data structure shown in FIG. 2.

The computer 100 is connected to the computers 10-1 to 10-3 via the networks 2 and 3. The cluster manager 12 in the computer 100 communicates with the command converters 132-1 to 132-3 in the cluster RAID controllers 13-1 to 13-3 of the computers 10-1 to 10-3 via the network 3.

In the cluster system of the first embodiment with the configuration of FIG. 1, the cluster managers 12-1 to 12-3 and cluster RAID controllers 13-1 to 13-3 operate on the computers 1-1 to 1-3 connected to the disk drives 4-1 to 4-3 which constitute a virtual RAID 40. Thus, the load of the computers 1-1 to 11-3 is heavy, decreasing the processing capacity.

In the cluster system of the embodiment 2 with the structure shown in FIG. 5, however, a computer 100 is provided exclusively for a cluster manager 12, independently of the computers 10-1 to 10-3 on which the cluster RAID controllers 13-1 to 13-3 operate. Thus, the load on the computers 10-1 to 10-3 is reduced compared with the case where the cluster manager operates on the computers 10-1 to 10-3.

The cluster system of FIG. 1 will not stop operation as a whole if a failure occurs in one of the computers 1-1 to 1-3 constituting the system. However, in the cluster system with the structure shown in FIG. 5, if a failure occurs in the computer 100 on which the cluster manager 12 is operating, the position information conversion table 120 cannot be used. Thus, the whole cluster system becomes inoperable at that time. It is therefore recommendable to duplicate the computer 100 to increase the availability of the whole cluster system.

It is assumed in the above description that RAID data or parity is stored in the disk drives 4-1 to 4-3 constituting the virtual RAID 40. For example, RAID data d1, d2 are stored in the disk drives 4-1, 4-2, while parity p is stored in the disk drive 4-3. However, the second embodiment is not restricted to this structure. For example, it is possible to apply the technique called striping, which divides the disk area provided by disk drives 4-1 to 4-3 of the virtual RAID 40 into a plurality of stripes and manages these stripes. The present invention can be embodied in the structure called RAID level 3, for example, in which RAID data d1-$i$, d2-$i$ and parity p-$i$ are stored in the disk drives 4-1, 4-2, 4-3 for each stripe i. The invention can also be embodied in the structure called RAID level 5, in which RAID data d1-$i$, d2-$i$ and parity p-$i$ are dispersed in all disk drives 4-1, 4-2 and 4-3. By striping, a plurality of disk drives can simultaneously operate more flexibly when reading/writing from/to RAID data, and scalable performance can be obtained. The present invention realizes scalable performance by locking disk access, even without striping, in RAID level 5.

The above description is based on computers 1-1 to 1-3 or the computer 100 and computers 10-1 to 10-3 are connected through two networks 2 and 3. The network 3 is used for communication between the cluster mangers 12-1 to 12-3 or between the cluster manager 12 and the cluster RAID controllers 13-1 to 13-3. Further, the network 2 is used for communication between the command transfer units 133-1 to 133-3 in the cluster RAID controllers 13-1 to 13-3, that is, for command transfer and data transfer. It is to be noted, however, that the second embodiment is not restricted to the above forms. For example, one network can be used for the above two kinds of communication. This simplifies the cluster system, though the communication speed may be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cluster system comprising a plurality of computers connected to each other through at least one network and disk drives connected to said computers, and managing said disk drives as a component of a virtual redundant array of inexpensive disks, said cluster system comprising:
   a cluster manager which performs exclusive control of said cluster system, and converts a global command which is a read/write command to said virtual redundant array of inexpensive disks into one of local commands including a read/write command to at least one of said disk drives and a parity calculate command; and
   a control unit which operates independently of said cluster manager on said plurality of computers, said control unit comprising:
   a command conversion function means operating in one of said computers for making said cluster manager convert generated global command into at least one of said local commands when the global command is generated in said one of said computers;
   a disk control means for reading/writing from/to at least one of said disk drives according to transferred local command;
   a parity calculation means for calculating parity according to the transferred local command; and
   a command transfer means for transferring the local command converted by said cluster manager to one of a corresponding computer of said computers, said disk control means and said parity calculation means according to the contents of the converted local command.

2. A cluster system according to claim 1, wherein said cluster manager converts the global command into a local command which is a command to calculate the intermediate or final result of the parity calculation using the information necessary for the parity calculation, in the computer connected to the disk drive which stores said information, and when calculating the intermediate result, transfer the intermediate result to the computer connected to the disk drive which stores the information necessary to calculate the next intermediate result or final result of the parity calculation.

3. A cluster system according to claim 1, wherein said cluster manager is provided on each of said plurality of computers, and operates synchronously with the other cluster managers provided on the other computers.

4. A cluster system according to claim 1, wherein said cluster manager operates on a computer provided exclusively for said cluster manager independently of said each plurality of computers, and said control units operating on said plurality of computers communicate with said cluster manager.

5. A computer connected to a disk drive comprised by a cluster system which comprises a plurality of computers connected to each other through at least one network and disk drives connected to said plurality of computers, and manages said disk drives as a component of a virtual redundant array of inexpensive disks, said computer comprising:
   a cluster manager which performs exclusive control of the cluster system, and converts a global command which is a read/write command to said virtual redundant array of inexpensive disks into one of local commands including a read/write command to at least one of said disk drives and a parity calculate command;
   a command conversion function means operating in one of said computers for making said cluster manager convert generated global command into at least one of said local commands when the global command is generated in said one of said computers;
   a disk control means for reading/writing from/to at least one of said disk drives according to transferred local command;
   a parity calculation means for calculating parity according to the transferred local command; and
   a command transfer means for transferring the local command converted by said cluster manager to one of a corresponding computer of said plurality of computers, said disk control means and said parity calculation means according the contents of the converted local command.

6. A computer connected to a disk drive for a cluster system which includes a plurality of computers connected to disk drives and a computer for a cluster manager connected to each other through at least one network, and manages said disk drives as a component of a virtual redundant array of inexpensive disks, said computer for the cluster manager performs exclusive control of the cluster system, and converts a global command which is a read/write command to said virtual redundant array of inexpensive disks into one of local commands including a read/write command to at least one of the disk drives and a parity calculate command, said computer comprising:

a command conversion function means operating in one of said computers for making said cluster manager convert generated global command into at least one of said local commands when said global command is generated in said one of said computers;

a disk control means for reading/writing from/to at least one of said disk drives according to transferred local command;

a parity calculation means for calculating parity according to the transferred local command; and     a command transfer means for transferring the local command converted by said cluster manager to one of a corresponding computer of said plurality of computers, said disk control means and said parity calculation means according to the contents of the converted local command.

7. A method of calculating parity in a cluster system including a plurality of computers connected to each other through at least one network and disk drives connected to said plurality of computers, and managing said disk drives as a component of a virtual redundant array of inexpensive disks, said method comprising:

transferring first information necessary for parity calculation from a first computer, which is one of said plurality of computers, to a second computer, which is another one of said plurality of computers, connected to the disk drive which stores second information necessary for calculating the intermediate result or final result of the parity calculation using said first information;

reading said second information from the disk drive connected to the second computer, and calculating the intermediate result or final result of the parity calculation using the first and second information;

transferring the calculated intermediate result to the computer connected to the disk drive which stores the information necessary to calculate the next intermediate result or final result of the parity calculation when the second computer calculates said intermediate result, and storing the calculated final result in the disk drive connected to the second computer when said second computer calculates said final result; and     transferring the calculated intermediate results of the parity calculation sequentially to the computer connected to the disk drive which stores the information necessary to calculate the next intermediate result or final result of the parity calculation.

* * * * *